United States Patent
Vezil et al.

(10) Patent No.: US 12,440,803 B2
(45) Date of Patent: *Oct. 14, 2025

(54) SYSTEMS AND METHODS FOR SINGLE HEADER GLYCOL DISTRIBUTION FOR MULTIPLEXED HEAT EXCHANGERS

(71) Applicant: Ingersoll-Rand Industrial U.S., Inc., Davidson, NC (US)

(72) Inventors: Stefano Vezil, Trieste (IT); Henry Y. Mark, Philadelphia, PA (US); Riccardo Poian, Gorizia (IT); Scott A. Johnson, Honey Brook, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,761

(22) Filed: Mar. 5, 2024

(65) Prior Publication Data

US 2024/0342647 A1 Oct. 17, 2024

Related U.S. Application Data

(63) Continuation of application No. 17/137,757, filed on Dec. 30, 2020, now Pat. No. 11,918,954.

(51) Int. Cl.
*B01D 53/26* (2006.01)
*F04B 39/16* (2006.01)
*F28D 21/00* (2006.01)

(52) U.S. Cl.
CPC ............ *B01D 53/265* (2013.01); *F04B 39/16* (2013.01); *B01D 2257/80* (2013.01); *F28D 2021/0038* (2013.01)

(58) Field of Classification Search
CPC ... B01D 53/265; B01D 2257/80; F04B 39/16; F28D 2021/0038
See application file for complete search history.

(56) References Cited

U.S. PATENT DOCUMENTS 9,120,054 B2 * 9/2015 De Piero ............... F28D 9/0093
2007/0261682 A1 * 11/2007 Smith .................. F02B 29/0443
60/599

(Continued)

FOREIGN PATENT DOCUMENTS

WO 2012135864 A1 10/2012
WO 2012135864 A9 4/2013

OTHER PUBLICATIONS

Extended European Search Report for Application No. 21214188.1, dated Jun. 9, 2022.

*Primary Examiner* — Youngsul Jeong
(74) *Attorney, Agent, or Firm* — Kevin E. West; Advent, LLP

(57) ABSTRACT

Cooling medium circulation systems for supplying a cooling medium through a single header to multiplexed heat exchangers are described. In an aspect, a system includes, but is not limited to, a storage tank configured to hold a cooling medium in a fluid state; first and second circulation pumps fluidically coupled to the storage tank; a single cooling medium header fluidically coupled with each of the circulation pumps; a first dryer module configured to direct a first portion of cooling medium from the single cooling medium header past a first stream of compressed air and to direct the first portion of cooling medium back to the storage tank; and a second dryer module fluidically configured to direct a second portion of cooling medium from the single cooling medium header past a second stream of compressed air.

20 Claims, 1 Drawing Sheet

(56) References Cited

U.S. PATENT DOCUMENTS

2017/0074528 A1\* 3/2017 De Piero .............. B01D 53/265
2017/0204780 A1\* 7/2017 Asano ................. F02B 29/0443
2020/0173695 A1\* 6/2020 Dahlberg .............. F28D 9/0093

\* cited by examiner

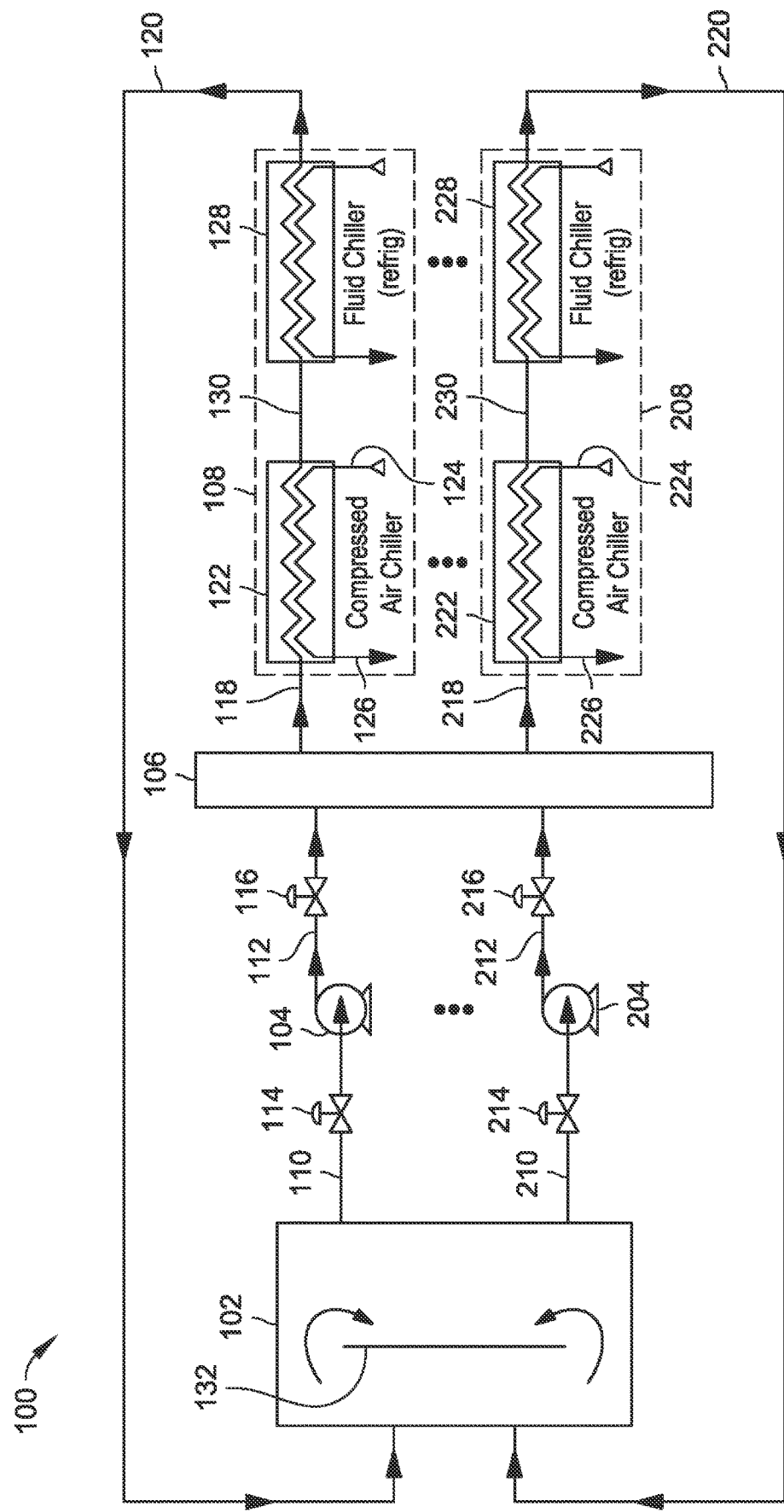

SYSTEMS AND METHODS FOR SINGLE HEADER GLYCOL DISTRIBUTION FOR MULTIPLEXED HEAT EXCHANGERS

DRAWINGS

The Detailed Description is described with reference to the accompanying figures. The use of the same reference numbers in different instances in the description and the figures may indicate similar or identical items.

The FIGURE is a schematic illustration of a cooling medium circulation system in accordance with an example embodiment of the present disclosure.

DETAILED DESCRIPTION

Overview

Compressed air systems treat a source of air, such as environmental air, by compressing the air to provide a source of compressed air for work applications. The air may have moisture present following treatment by the compressed air system, such as due to humidity conditions in the environment supplying the source air. Moisture can be detrimental to various compressed air applications, such as by posing a risk for machines that utilize the compressed air, products treated by application of the compressed air, products produced with the compressed air, and the like. For example, moisture in compressed air can contribute to risks for rust, corrosion, contamination, bacterial growth, dilution, and the like. To reduce the amount of moisture present in compressed air, compressed air systems can include or be coupled with heat exchange systems to remove moisture through condensation of moisture and separation of the condensation from the flow of compressed air. The heat exchange systems can circulate a cooling medium, such as water, glycol, synthetic refrigerant, or the like, to cool a flow of compressed air and heat the cooling medium. The heated cooling medium can then be discarded or chilled to provide cooling for future applications.

Compressed air systems can incorporate multiple heat exchange systems for drying multiple flows of compressed air. For example, compressed air systems can include multiple dryer modules that share a source of cooling medium that is circulated through the modules. The cooling medium can be stored in a storage tank for transfer to the individual dryer modules by one or more pumps. As the dryer modules treat the compressed air, the cooling medium is heated during condensation of the moisture and then subsequently cooled (e.g., by a chiller) and transferred back to the storage tank. The dryer modules can be cycled depending on a duty of the chiller used to cool the cooling medium after drying the compressed air. For example, as more compressed air is dried by a module, the chiller of that module requires a higher uptime to re-cool the cooling medium. For modules having lower chiller duty (e.g., modules with lower compressed air drying requirements), the chiller may not require as much power to operate efficiently. However, if one or more of the dryer modules is inactive or electrically de-energized, such as during maintenance or failure of one or more portions of the dryer modules, the temperature of the cooling medium may be provided to one or more dryer modules at differing temperatures, providing variable dew point outputs between or within modules, inconsistent drying of compressed air, and other performance inefficiencies.

Accordingly, the present disclosure is directed, at least in part, to systems and methods for distributing a cooling medium to a plurality of dryer modules having heat exchanger systems that cool an incoming compressed air stream with the cooling medium. The cooling medium is circulated from a storage tank via a plurality of fluid lines coupled with individual circulation pumps which direct the cooling medium from the plurality of fluid lines into a single header that is coupled with the plurality of dryer modules. In an aspect, each dryer module includes a heat exchanger that receives the cooling medium from the single header via individual fluid connections to cool a flow of compressed air passing through the heat exchanger. As the compressed air is cooled by warming the cooling medium, moisture held in the compressed air is condensed and removed from the flow of compressed air. The warmed cooling medium is then chilled and sent back to the glycol storage tank where it is mixed with other cooling medium contained therein, which can provide a uniform supply temperature of cooling medium, even when one or more of the heat exchangers does not have an active frigorific circuit to cool the cooling medium following cooling of the compressed air. Since the cooling medium transferred to the dryer modules is stored in a common storage tank, the cooling medium received from all of the dryer modules at various temperatures can be mixed within the storage tank and supplied the single header, where the cooling medium is available to any of the plurality of dryer modules at the same input temperature. The single supply header also assures distribution of cooling medium to all heat exchanger modules in an event when one of modules is electrically de-energized, for example for a maintenance activity.

Example Implementations

Referring generally to the FIGURE, a system 100 for distributing a cooling medium to a plurality of dryer modules for drying a plurality of compressed air streams is described in accordance with example embodiments of the present disclosure. The system 100 is shown including a storage tank 102, a circulation pump 104, a cooling medium header 106, a dryer module 108, a circulation pump 204, and a dryer module 208. The system 100 distributes a cooling medium from the storage tank 102 to the cooling medium header 106 for supply to each dryer module fluidically coupled with the cooling medium header 106 to condense moisture carried in flows of compressed air through the dryer modules. In the FIGURE, each of dryer module 108 and dryer module 208 are fluidically coupled with the cooling medium header 106 to receive cooling medium flowed therethrough. While the FIGURE shows two dryer modules fluidically coupled with the cooling medium header 106 (e.g., dryer module 108 and dryer module 208), the system 100 is not limited to such configurations. For instance, the system 100 can include more than two dryer modules fluidically coupled with the cooling medium header 106, including, but not limited to, three dryer modules, four dryer modules, five dryer modules, six dryer modules, seven dryer modules, eight dryer modules, more than eight dryer modules, or the like.

The storage tank 102 holds a volume of cooling medium suitable for distribution throughout the system 100 to condense moisture carried in flows of compressed air through the dryer modules. The capacity of the storage tank 102 can depend on the type of cooling medium utilized, the number of dryer modules, the throughput of compressed gas processed by the system 100, and the like. In example implementations, the storage tank 102 holds a volume of approximately 70 gallons to approximately 300 gallons to support from two to eight dryer modules for an air capacity of approximately 3,500 standard cubic feet per minute (SCFM) of compressed air to approximately 25,000 SCFM of compressed air. Alternatively or additionally, the system 100 can include a plurality of storage tanks 102 to store cooling medium for the dryer modules, for example, where a first storage tank 102 can provide cooling medium to a first subset dryer modules of the system 100, a second storage tank 102 can provide cooling medium to a second subset dryer modules of the system 100, and so on. In implementations, the plurality of storage tanks 102 include a single common cooling medium header 106. Alternatively, the plurality of storage tanks 102 include different cooling medium headers 106 for the individual subsets of dryer modules.

The storage tank 102 stores the cooling medium following refrigeration of the cooling medium by the dryer modules. In implementations, the storage tank 102 is thermally insulated to maintain the cooling medium at a cold temperature to provide a pressure dew point in the dryer modules from about 40° F. to about 32° F. The cooling medium can include, but is not limited to, a glycol-based medium (e.g., propylene glycol, ethylene glycol, etc.), water, a synthetic refrigerant, or combinations thereof. For example, the cooling medium can include a blend of glycol with water in a volumetric ratio of about 1:2.

A plurality of circulation pumps draws cooling medium from the storage tank 102 and supplies the cooling medium to the cooling medium header 106. While the FIGURE shows two circulation pumps coupled between the storage tank 102 and the cooling medium header 106 (e.g., circulation pump 104 and circulation pump 204), the system 100 is not limited to such configurations. For instance, the system 100 can include more than two circulation pumps fluidically coupled between the storage tank 102 and the cooling medium header 106, including, but not limited to, three circulation pumps, four circulation pumps, five circulation pumps, six circulation pumps, seven circulation pumps, eight circulation pumps, more than eight circulation pumps, or the like. In implementations, the system 100 includes one or more pumps for each dryer module fluidically coupled with the storage tank 102. Multiple circulation pumps can provide redundancy of flow of cooling medium to the cooling medium header 106, which can ensure continuous flow of cooling medium in events where one or more circulation pumps are offline or otherwise not pumping fluid (e.g., during a maintenance activity, loss of power, failure of one or more components, etc.).

In implementations, each circulation pump is fluidically coupled to each of the storage tank 102 and the cooling medium header 106 via individual fluid lines to supply the cooling medium to the cooling medium header 106 through each of the individual fluid lines during operation of the respective circulation pumps. For example, the circulation pump 104 is fluidically coupled with the storage tank 102 via fluid line 110 and with the cooling medium header 106 via fluid line 112, and the circulation pump 204 is fluidically coupled with the storage tank 102 via fluid line 210 and with the cooling medium header 106 via fluid line 212. In implementations, each of the circulation pumps is operated on a continuous basis to continuously draw cooling medium from the storage tank 102 and direct the cooling medium into the cooling medium header 106. The system can include valves to isolate the circulation pumps during service, to control fluid direction of cooling medium, or the like. For example, the system can include valve 114 between the circulation pump 104 and the storage tank 102, valve 116 between the circulation pump 104 and the cooling medium header 106, valve 214 between the circulation pump 204 and the storage tank 102, valve 216 between the circulation pump 204 and the cooling medium header 106, or combinations thereof.

As shown in the FIGURE, the system 100 includes a single cooling medium header (e.g., cooling medium header 106) during circulation of the cooling medium throughout the system 100. For example, in implementations, the cooling medium made available to the dryer modules and received from the dryer modules is combined in two regions of the system 100. First, the cooling medium is stored and mixed in the storage tank 102. Second, the cooling medium is stored and mixed in the cooling medium header 106 to be made available to each of the dryer module 108 and the dryer module 208. Other regions of the system 100 separate the cooling medium within confined flow paths (e.g., fluid lines 110 and 112, fluid lines 210 and 212, within the dryer module 108, within the dryer module 208, transferred from the dryer module 108 to the storage tank 102, transferred from the dryer module 208 to the storage tank 102). The cooling medium header 106 receives cooling medium from each of the circulation pump 104 and the circulation pump 204, where the cooling medium is permitted to span the length of the cooling medium header 106 to be available to each of the dryer module 108 and the dryer module 208 at the same inlet temperature. The system 100 permits mixture of the cooling medium in the storage tank 102 following receipt from the dryer modules 108 and 208 to provide an initial mixing of streams of cooling medium that may be at different temperatures dependent on the duty experienced by the dryer modules 108 and 208 (e.g., proportional to the flow of compressed air through the respective dryer modules). The cooling medium can again mix in the cooling medium header 106 prior to transfer to the dryer module 108 or the dryer module 208. The cooling medium header 106 can be dimensioned based on the volumetric flow of cooling medium through the system 100, based on the number of dryer modules serviced by the storage tank 102, or the like. In implementations, the cooling medium header 106 includes a capped conduit having an inner diameter from about two inches to about twelve inches, however the system 100 is not limited to such dimensions and can have larger or smaller diameters for the cooling medium header 106 dependent on system throughput.

The dryer modules of the system 100 receive cooling medium from the cooling medium header 106 through individual fluid lines for each dryer module and output used cooling medium to the storage tank 102 through individual fluid lines for each dryer module. For example, dryer module 108 receives cooling medium from the cooling medium header 106 via fluid line 118 and transfers cooling medium (e.g., cooling medium having been heated by heat exchange with compressed air within the dryer module 108) to the storage tank 102 via fluid line 120, whereas dryer module 208 receives cooling medium from the cooling medium header 106 via fluid line 218 and transfers cooling medium (e.g., cooling medium having been heated by heat exchange with compressed air within the dryer module 208) to the storage tank 102 via fluid line 220.

In implementations, the dryer modules first direct the cooling medium received from the cooling medium header 106 into one or more heat exchangers to transfer heat from a stream of compressed air to the cooling medium to cool the compressed air, condense moisture held by the compressed air, and warm the cooling medium. For example, the dryer module 108 directs cooling medium from fluid line 118 into a heat exchanger 122 having an input stream 124 of compressed air that passes by a separated flow of cooling medium to condense moisture held in the compressed air and dry the compressed air for output at 126. Similarly, the dryer module 208 directs cooling medium from fluid line 218 into a heat exchanger 222 having an input stream 224 of compressed air that passes by a separated flow of cooling medium to condense moisture held in the compressed air and dry the compressed air for output at 226. The condensation separated from the compressed air is then removed from the dryer module, such as through an air/moisture separator, water trap, or other separation system.

Warmed cooling medium (or chilled cooling medium if no flow of compressed air is circulated within the dryer module) is transferred from the heat exchanger to a chiller that cools cooling medium in preparation for transfer back to the storage tank 102. For example, the dryer module 108 directs cooling medium from the heat exchanger 122 to a chiller 128 via fluid line 130, and the dryer module 208 directs cooling medium from the heat exchanger 222 to a chiller 228 via fluid line 230. The chillers 128 and 228 can include compressors, condensers, thermal expansions valves, or the like, or combinations thereof, to chill the cooling medium for output to the storage tank 102 via fluid lines 120 and 220, respectively. In implementations, the dryer modules include temperature sensors (e.g., thermistors, thermocouple, etc.) to determine a temperature of cooling medium to control operation of the chillers. For example, the dryer module 108 can include a temperature sensor to determine a temperature of cooling medium leaving the heat exchanger 122, where a controller of the dryer module 108 directs operation of the chiller 128 to cool the cooling medium if the temperature exceeds a threshold temperature. Alternatively or additionally, the storage tank 102 or another portion of the system 100 can include one or more temperature sensors to control operation of the chillers.

The storage tank 102 can include one or more mixing structures or devices to mix cooling medium received through individual fluid connections between the storage tank 102 and each of the drying modules 108. For example, the storage tank 102 can include, but is not limited to, one or more impellors, baffles, flow expanders, flow compressors, or combinations thereof to mix cooling medium received from fluid lines 120 and 220 and any additional fluid lines coupled from the dryer modules to the storage tank 102. In implementations, the storage tank 102 includes a baffle 132 in an interior of the storage tank 102 against which at least a portion of the cooling medium received from one or both of the fluid lines 120 and 220 is directed to mix the cooling medium. Mixing of cooling medium within the storage tank 102 can providing a substantially similar temperature of cooling medium drawn from the storage tank 102 by each of the circulation pumps, which in turn can provide a consistent dew point during heat exchange within the dryer modules.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system for circulating a cooling medium to condense moisture held in compressed air, the system comprising:
    a storage tank configured to hold a cooling medium in a fluid state within an interior of the storage tank;
    a first circulation pump fluidically coupled to the storage tank;
    a second circulation pump fluidically coupled to the storage tank;
    a single cooling medium header fluidically coupled with each of the first circulation pump and the second circulation pump;
    a dryer module fluidically coupled with each of the single cooling medium header and the storage tank, the dryer module configured to direct a portion of cooling medium received from the single cooling medium header past a stream of compressed air to condense at least a portion of moisture held in the stream of compressed air, the dryer module configured to direct the portion of cooling medium back to the storage tank.

2. The system of claim 1, wherein the single cooling medium header is fluidically coupled with each of the first circulation pump and the second circulation pump via separate fluid lines.

3. The system of claim 1, wherein the storage tank includes a baffle in the interior configured to mix cooling medium received from the dryer module.

4. The system of claim 1, wherein the dryer module includes an outlet that is fluidically coupled with the storage tank via a fluid line.

5. The system of claim 4, wherein the storage tank includes a baffle in the interior, and wherein the fluid line includes a portion directed towards the baffle to mix cooling medium received from the dryer module.

6. The system of claim 1, wherein the dryer module includes a chiller configured to reduce a temperature of the portion of cooling medium following condensation of at least a portion of moisture held in the stream of compressed air and prior to directing the portion of cooling medium back to the storage tank.

7. The system of claim 1, wherein the first circulation pump is fluidically coupled to the storage tank via a first fluid line.

8. The system of claim 7, further comprising a first valve coupled between the first circulation pump and the storage tank on the first fluid line.

9. The system of claim 8, further comprising a second valve coupled between the first circulation pump and the single cooling medium header.

10. The system of claim 7, wherein the second circulation pump is fluidically coupled to the storage tank via a second fluid line.

11. The system of claim 10, comprising a first valve coupled between the second circulation pump and the storage tank on the second fluid line.

12. The system of claim 11, further comprising a second valve coupled between the second circulation pump and the single cooling medium header.

13. A system for circulating a cooling medium to condense moisture held in compressed air, the system comprising:
    a storage tank configured to hold a cooling medium in a fluid state within an interior of the storage tank;
    a first circulation pump fluidically coupled to the storage tank;
    a second circulation pump fluidically coupled to the storage tank;
    a cooling medium header fluidically coupled with the first circulation pump via a first fluid line and with the second circulation pump via a second fluid line;
    a dryer module fluidically coupled with each of the cooling medium header and the storage tank, the dryer module configured to direct a portion of cooling medium received from the cooling medium header past a stream of compressed air to condense at least a portion of moisture held in the stream of compressed air, the dryer module configured to direct the portion of cooling medium back to the storage tank.

14. The system of claim 13, wherein the storage tank includes a baffle in the interior configured to mix cooling medium received from the dryer module.

15. The system of claim 13, wherein the dryer module includes a chiller configured to reduce a temperature of the portion of cooling medium following condensation of at least a portion of moisture held in the stream of compressed air and prior to directing the portion of cooling medium back to the storage tank.

16. The system of claim 13, wherein the first circulation pump is fluidically coupled to the storage tank via a third fluid line.

17. The system of claim 16, further comprising a first valve coupled between the first circulation pump and the storage tank on the third fluid line.

18. The system of claim 17, further comprising a second valve coupled between the first circulation pump and the cooling medium header on the first fluid line.

19. The system of claim 16, wherein the second circulation pump is fluidically coupled to the storage tank via a fourth fluid line.

20. The system of claim 19, further comprising
a first valve coupled between the second circulation pump and the storage tank on the fourth fluid line; and
a second valve coupled between the second circulation pump and the cooling medium header on the second fluid line.

* * * * *